UNITED STATES PATENT OFFICE.

JOHN McDOUGALL, OF LONDON, ENGLAND.

MANUFACTURE OF OIL-CAKE.

SPECIFICATION forming part of Letters Patent No. 253,821, dated February 14, 1882.

Application filed August 4, 1879. Patented in England December 20, 1878.

*To all whom it may concern:*

Be it known that I, JOHN McDOUGALL, of the firm of McDOUGALL BROTHERS, of London and Manchester, in the Kingdom of England, manufacturing chemists and corn-millers, have invented Improvements in the Manufacture of Oil-Cakes, of which the following is a specification.

This invention relates to the production of oil-cakes for feeding live stock and for other purposes, and has for its object the more efficient extraction of the oil from cotton-seed and the utilization of the husks thereof.

According to the method heretofore commonly adopted the cotton-seed is subjected to the action of edge-runners and then hot-pressed to express the oil, the residuum being known as "oil-cake." The same method is pursued with linseed and rape and other oleaginous seed. In operating upon cotton-seed, however, difficulties arise by reason of the thickness and toughness of the husk which is not properly acted upon by the edge-runners. In order to overcome these difficulties it has been proposed to first dry and crack by a special mill the cotton-seeds, and then, after removal of the husks to be used for manure, to grind the kernel in another mill and press the cake in the cold or hot way, the ordinary edge-runners being discarded. By this method what is known as "decorticated cake" is made, while the cake made by the method first indicated is undecorticated, or contains the husks in a partly-ground state mixed with the ground and pressed kernels.

Heretofore the manufacture of undecorticated cake has been confined to the smooth kind of cotton-seed, the hairy or hirsute variety commonly produced in the United States being unsuitable to the purpose on account of the hair or fiber, the presence of which in the cake unfits it for food.

I have found that by passing the seed between horizontal millstones, such as commonly used for grinding wheat, set a proper distance apart, as hereinafter specified, the action of the stones is to ball the fiber so that it can be removed. The hirsute or hairy cotton-seed, therefore, as well as the smooth variety, can be profitably manufactured into undecorticated cake.

So far as I am aware ordinary millstones have never prior to this invention been utilized for cracking or breaking cotton-seed.

When the husks are ground under edge-runners with the kernels they are only partly reduced and remain in the cake in a coarse condition. In order to improve the quality of undecorticated cake in this respect, I grind the husks apart from the kernels. In the present invention, therefore, the seed, after cracking by millstones, is subjected to the action of edge-runners and pressed, so that the oil is effectively extracted and the husks are separated after the cracking operation, ground apart from the kernels, and afterward mixed in any desired proportion with them, so that they may be utilized for food, a new product being thus obtained. This new product constitutes an improved quality of undecorticated or partially decorticated cake.

In order that the invention may be fully understood, the manner of carrying it into effect will now be described.

Cotton-seed is passed between millstones, which are arranged to work at such a distance from each other that they shall crack, break, or grind the seed, but only to such an extent as not to liberate the oil in the seed sufficiently to cause the broken seed to paste or adhere to the stones. The husks of the broken seeds are then separated from the kernels by means of sieves or other separators, and are ground or further reduced under millstones, if desired. The ground husks are to be mixed with the kernels in any desired proportions. The kernels are passed under edge-runners and subsequently subjected to heat and pressure in the usual manner. The product obtained by the foregoing treatment is an oil-cake containing ground cotton-seed husks, and is an improved quality of undecorticated or partially decorticated cake.

The ground husks may be mixed with the kernels before or after the crushing and grinding of the kernels by the edge-runners, and they may also be employed in the manufacture of other oil-cakes—such, for example, as rape-cakes and linseed-cakes.

When the cotton-seed is of the hirsute or hairy kind it may with advantage be passed through barley-mills or other known apparatus, in order to effect the removal of a portion of the cotton fiber adhering to it before passing it under the millstones.

If the cake is required to be as free from fiber as practicable, the separation of the last portions thereof, with this or with other seeds, may be effected after the cracking operation by means of sieves or other separators.

It is obvious that, proceeding in the manner explained, if the ground husks be not added to the kernels before the passage of the latter under edge-runners decorticated cake would be taken from the press; that if the husks had not been separated at all from the kernels ordinary undecorticated oil-cake would be produced, and that in either case the treatment would be in accordance with the first part of the invention, which comprises the three steps of cracking or partial grinding of the cotton-seed, crushing and grinding under edge-runners, and pressing, in the order named.

Having now fully described and ascertained the nature of my said invention, and the manner in which the same is or may be carried into effect, what I claim is—

1. The method of treating cotton-seed by cracking or partially grinding the seed between millstones—such as commonly employed for grinding wheat—set far enough apart to crack or mash the seed without liberating the oil, so that the fiber on the seed is balled by the action of the stones, substantially as described.

2. The method of treating cotton-seed in manufacture of oil-cake, by cracking or partial grinding between millstones, crushing and grinding under edge-runners, and pressing, substantially as described.

3. The method of utilizing cotton-seed husks by grinding the same apart from the kernels and introducing the ground husks into oil-cake, substantially as described.

4. The process of making oil-cake, consisting in treating cotton-seed by cracking or partial grinding between millstones, crushing and grinding under edge-runners, and pressing, in separating the husks after the cracking operation, and grinding them apart from the kernels, and in introducing the ground husks into the oil-cake in admixture with said kernels, substantially as described.

5. The new product described, being oil-cake containing ground cotton-seed husks.

In witness whereof I have signed my name to this specification in the presence of two subscribing witnesses.

JOHN McDOUGALL.

Witnesses:
 RUDOLPH CHAS. NICKOL,
 GEORGE PAYNE,
 Clerks to John Newton & Sons, Public Notaries, 31 Lombard Street, London.